United States Patent [19]

Fitzgerald et al.

[11] Patent Number: 5,640,442
[45] Date of Patent: Jun. 17, 1997

[54] TECHNIQUE FOR DETERMINING PROPAGATING AND CLEAR FREQUENCY TO BE USED IN WIDE AREA WIRELESS DATA COMMUNICATIONS NETWORK

[75] Inventors: Brendan T. Fitzgerald, Indialantic; Andrew T. Powshok, Indian Harbour Beach, both of Fla.; Donald K. Belcher, Rogersville, Tenn.; Jeffrey R. White, Melbourne Village, Fla.; Albert D. Darby, Jr., Valkaria, Fla.; Rodney Nelson, Merritt Island, Fla.

[73] Assignee: Flash Comm, Inc., Melbourne, Fla.

[21] Appl. No.: 719,307

[22] Filed: Sep. 24, 1996

Related U.S. Application Data

[63] Continuation of Ser. No. 471,977, Jun. 6, 1995, abandoned.

[51] Int. Cl.⁶ .................................................... H04Q 7/08
[52] U.S. Cl. .......................... 379/57; 455/56.1; 455/134
[58] Field of Search .............................. 379/57; 455/56.1, 455/134

[56] References Cited

U.S. PATENT DOCUMENTS

| | | |
|---|---|---|
| Re. 25,834 | 8/1965 | Gelzer et al. . |
| 3,179,907 | 4/1965 | Brand et al. . |
| 3,183,464 | 5/1965 | Takahata et al. . |
| 3,475,703 | 10/1969 | Kennedy et al. . |
| 3,477,299 | 11/1969 | Speer et al. . |
| 3,510,808 | 5/1970 | Baker . |
| 3,688,048 | 8/1972 | Clark . |
| 3,702,958 | 11/1972 | Reynolds ............... 361/298.5 |
| 3,723,882 | 3/1973 | Carlson . |
| 3,914,715 | 10/1975 | Hubing et al. . |
| 3,956,701 | 5/1976 | James, Jr. et al. . |
| 4,025,882 | 5/1977 | Takeo . |
| 4,050,050 | 9/1977 | Nakanishi et al. . |
| 4,052,675 | 10/1977 | Valdettaro . |
| 4,063,229 | 12/1977 | Welsh et al. . |
| 4,083,003 | 4/1978 | Haemmig . |
| 4,107,689 | 8/1978 | Jellinek . |
| 4,123,754 | 10/1978 | Armstrong . |
| 4,129,749 | 12/1978 | Goldman . |
| 4,185,287 | 1/1980 | Hubing et al. . |
| 4,207,522 | 6/1980 | Thornton et al. . |
| 4,234,960 | 11/1980 | Spilsbury et al. . |
| 4,263,674 | 4/1981 | Morii et al. . |
| 4,320,400 | 3/1982 | Chasek . |
| 4,360,927 | 11/1982 | Bowen et al. . |
| 4,363,134 | 12/1982 | Murata et al. . |
| 4,409,687 | 10/1983 | Berti et al. . |
| 4,491,978 | 1/1985 | Nagata et al. . |
| 4,523,184 | 6/1985 | Abel . |
| 4,531,232 | 7/1985 | Sakurai . |
| 4,541,119 | 9/1985 | Cooper et al. . |
| 4,584,709 | 4/1986 | Kneisel et al. . |

(List continued on next page.)

FOREIGN PATENT DOCUMENTS

| | | |
|---|---|---|
| 8500482 | 1/1985 | WIPO . |
| 9408361 | 4/1994 | WIPO . |
| 9419873 | 9/1994 | WIPO . |

*Primary Examiner*—William Cumming
*Attorney, Agent, or Firm*—Vinson & Elkins L.L.P.

[57] ABSTRACT

A two-way communications system that provides ubiquitous wireless data communication services, such as throughout the continental United States, by using a network of only a few, widely distributed radio base station (RBS) sites and the existing paging network infrastructure. The paging network infrastructure is used as an outbound link to request data from the remote field units. The outbound page message indicates a time and HF frequency at which the RBSs can expect to receive inbound data from the field units. A network hub or mission operation center (MOC) determines a radio frequency which is expected to be propagating and clear at the time that a particular field unit is to use the frequency as an inbound link. The MOC then issues the request for data to the field unit using an existing inexpensive wireless system such as the paging network infrastructure. The field units make use of paging receivers, and an HF transmitter to report remote data such as a geoposition or other sensor data when requested to do so.

20 Claims, 8 Drawing Sheets

U.S. PATENT DOCUMENTS

| | | | |
|---|---|---|---|
| 4,608,559 | 8/1986 | Friedman et al. | |
| 4,608,712 | 8/1986 | Fedde | |
| 4,617,831 | 10/1986 | Ohashi et al. | |
| 4,625,212 | 11/1986 | Oda et al. | |
| 4,628,152 | 12/1986 | Akerberg | |
| 4,644,351 | 2/1987 | Zabarsky et al. | |
| 4,644,561 | 2/1987 | Paneth et al. | |
| 4,665,401 | 5/1987 | Garrard et al. | |
| 4,682,367 | 7/1987 | Childress et al. | |
| 4,712,112 | 12/1987 | Carr | |
| 4,740,792 | 4/1988 | Sagey et al. | |
| 4,792,988 | 12/1988 | Ohashi et al. | |
| 4,804,967 | 2/1989 | Ohe et al. | |
| 4,819,001 | 4/1989 | Ohe et al. | |
| 4,823,142 | 4/1989 | Ohe et al. | |
| 4,849,750 | 7/1989 | Andros et al. | |
| 4,850,030 | 7/1989 | Hashimoto et al. | 455/31 |
| 4,851,830 | 7/1989 | Andros et al. | |
| 4,853,688 | 8/1989 | Andros et al. | |
| 4,856,083 | 8/1989 | Makino | |
| 4,857,915 | 8/1989 | Andros et al. | |
| 4,873,532 | 10/1989 | Sakurai et al. | |
| 4,879,570 | 11/1989 | Takizawa et al. | |
| 4,891,637 | 1/1990 | Siwiak et al. | |
| 4,894,856 | 1/1990 | Nakanishi et al. | |
| 4,897,835 | 1/1990 | Gaskill et al. | |
| 4,935,732 | 6/1990 | Andros et al. | |
| 4,965,607 | 10/1990 | Wilkins et al. | |
| 5,017,926 | 5/1991 | Ames et al. | 342/353 |
| 5,027,431 | 6/1991 | Tanaka et al. | 455/214 |
| 5,032,845 | 7/1991 | Velasco | |
| 5,046,130 | 9/1991 | Hall et al. | |
| 5,052,049 | 9/1991 | Andros et al. | |
| 5,054,120 | 10/1991 | Ushiyama et al. | |
| 5,055,851 | 10/1991 | Sheffer | |
| 5,063,560 | 11/1991 | Yerbury et al. | |
| 5,073,976 | 12/1991 | Kennedy | |
| 5,077,834 | 12/1991 | Andros et al. | |
| 5,099,245 | 3/1992 | Sagey | 342/357 |
| 5,119,102 | 6/1992 | Barnard | 342/357 |
| 5,122,795 | 6/1992 | Cubley et al. | |
| 5,136,719 | 8/1992 | Gaskill et al. | |
| 5,142,281 | 8/1992 | Park | |
| 5,146,227 | 9/1992 | Papadopoulos | |
| 5,153,582 | 10/1992 | Davis | |
| 5,155,688 | 10/1992 | Tanaka et al. | |
| 5,155,689 | 10/1992 | Wortham | 364/460 |
| 5,166,694 | 11/1992 | Russell et al. | |
| 5,206,643 | 4/1993 | Eckelt | |
| 5,208,756 | 5/1993 | Song | 364/449 |
| 5,218,367 | 6/1993 | Sheffer et al. | 342/457 |
| 5,225,842 | 7/1993 | Brown et al. | 342/357 |
| 5,225,847 | 7/1993 | Roberts et al. | |
| 5,227,804 | 7/1993 | Oda | |
| 5,254,986 | 10/1993 | DeLuca | |
| 5,258,985 | 11/1993 | Hammerle | |
| 5,266,945 | 11/1993 | Peek et al. | |
| 5,278,568 | 1/1994 | Enge et al. | 342/367 |
| 5,280,640 | 1/1994 | Bae | |
| 5,301,358 | 4/1994 | Gaskill et al. | |
| 5,355,522 | 10/1994 | Demange | 455/62 |
| 5,361,258 | 11/1994 | Arnold et al. | 370/69.1 |
| 5,371,899 | 12/1994 | Kuznicki et al. | 455/34.1 |
| 5,386,435 | 1/1995 | Cooper et al. | 375/200 |
| 5,410,737 | 4/1995 | Jones | 379/59 X |
| 5,438,329 | 8/1995 | Gastouniotis et al. | 455/67.1 X |
| 5,475,868 | 12/1995 | Duque-Anton et al. | 455/62 |
| 5,485,463 | 1/1996 | Godoroja | 370/95.1 |
| 5,526,401 | 6/1996 | Roach, Jr. et al. | 379/59 |
| 5,530,701 | 6/1996 | Stillman et al. | 455/62 X |

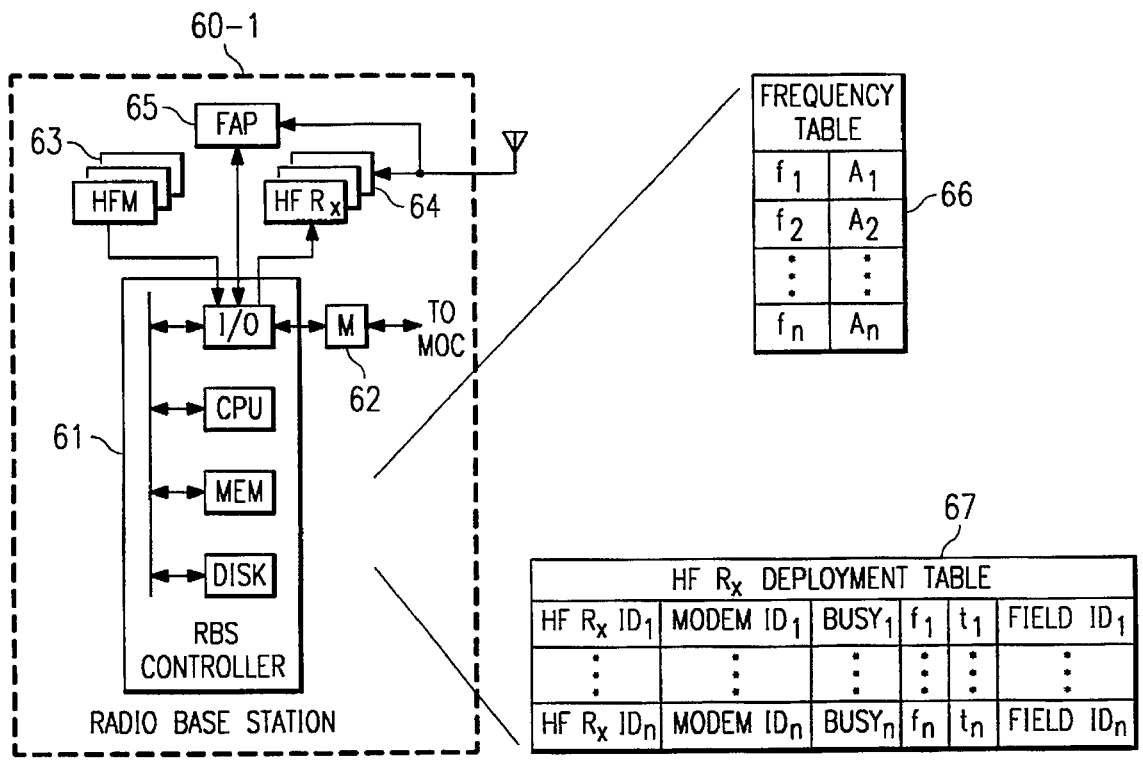
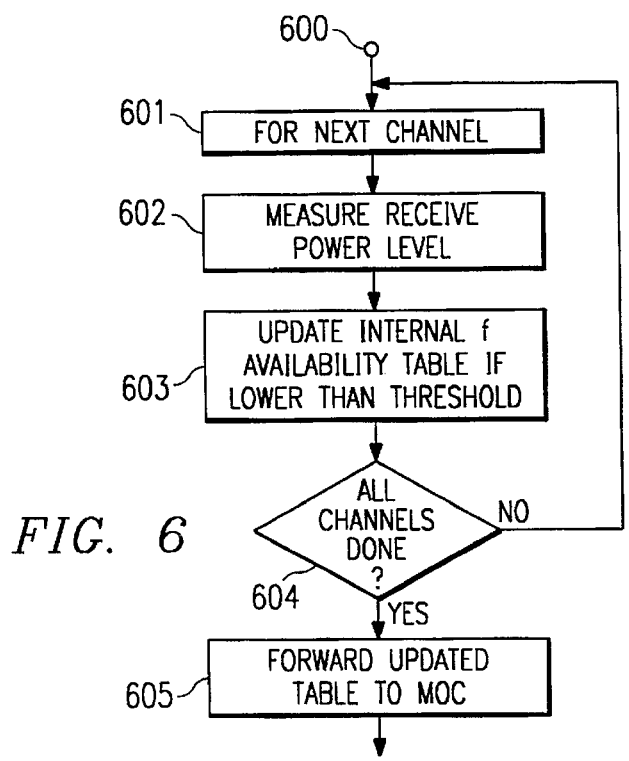
FIG. 5
FIG. 6

| X, Y ON GRID | | | | | | | | | | |
|---|---|---|---|---|---|---|---|---|---|---|
| LAT$_1$, LONG$_1$ | | 12A | 1A | 2A | 3A ... 11A | 12P | 1P ... 11P | | | |
| | LUF$_1$, MUF$_1$ | P$_{12A,1}$ | ... | ... | P$_{3A,1}$ | ... | P$_{11P,1}$ | | | |
| | LUF$_2$, MUF$_2$ | P$_{12,2}$ | ... | ... | P$_{3,2}$ | ... | P$_{11P,2}$ | | | |
| | ... | ... | | | ... | | ... | | | |
| | LUF$_n$, MUF$_n$ | P$_{12A,n}$ | ... | ... | P$_{3A,n}$ | ... | P$_{11P,n}$ | | | |
| LAT$_2$, LONG$_2$ | | 12A | 1A | 2A | 3A ... 11A | 12P | 1P ... 11P | | | |
| | LUF$_1$, MUF$_1$ | P$_{12A,1}$ | ... | ... | P$_{3A,1}$ | ... | P$_{11P,1}$ | | | |
| | LUF$_2$, MUF$_2$ | P$_{12,2}$ | ... | ... | P$_{3,2}$ | ... | P$_{11P,2}$ | | | |
| | ... | ... | | | ... | | ... | | | |
| | LUF$_m$, MUF$_m$ | P$_{12A,m}$ | ... | ... | P$_{3A,m}$ | ... | P$_{11P,m}$ | | | |

72-1

74a
74b
74c
74d

TECHNIQUE FOR DETERMINING PROPAGATING AND CLEAR FREQUENCY TO BE USED IN WIDE AREA WIRELESS DATA COMMUNICATIONS NETWORK

RELATED APPLICATIONS

This application is a continuation of application Ser. No. 08/471,977, filed Jun. 6, 1995, now abandoned.

FIELD OF THE INVENTION

This invention relates generally to radio communication systems, and in particular to a low cost wide area data communication system which provides reliable long distance communication by using a network of high frequency (HF) radio base stations which determine, in advance, which frequencies are expected to be propagating and clear.

BACKGROUND OF THE INVENTION

There exists a vital and continuing need for wireless communication networks of various types. Certain particular wireless systems are focused on the need for reliable two-way data communications. Such networks need not support particularly high data exchange rates, but should provide communication over as wide a geographic area as possible, such as the continental United States or Europe.

Unfortunately, many existing and even certain proposed systems costing millions of dollars have failings of one type or another. Consider, for example, existing wireless wide area data networks which support communication between a remote or mobile field unit and a base station. These networks either use terrestrial or satellite-deployed base stations. Terrestrial systems can be further classified as either one-way or two-way. One way terrestrial systems, such as nationwide paging networks like SkyTel, provide no capability for a remote user to send data. Although certain types of paging networks do support two-way data transfer, they only provide limited geographic coverage. In addition, such networks also typically exhibit relatively poor penetration of building structures, due to the high carrier frequencies at which they operate.

Other existing and proposed two-way terrestrial systems include the cellular networks, mobile data networks such as RAM, ARDIS, emerging PCS networks, EMBARC, and many others. While the data rates of these systems are typically quite high, each system requires the users to be within a close range, generally 20 miles or less, of the system base station infrastructure. This infrastructure is extremely expensive, requiring hundreds of millions of dollars to build a nationwide network. It can sometimes be cost effective to build such infrastructure in areas of high population density, and indeed, roughly 90% of the United States population can be supported by such systems. However, this terrestrial infrastructure only covers approximately 15-20% of the country geographically. It is simply not economical for providers of such services to install the required infrastructure in remote areas of low population density.

Several satellite networks, both existing and proposed, have been designed to address the issue of poor geographic coverage. These satellite-based systems also typically require a tremendous investment in infrastructure. The infrastructure is located in orbit where it cannot be installed, maintained or replaced without large expenditures for space-launch vehicles. In addition, the mobile subscriber or field devices required to communicate with such satellite systems are relatively expensive. Furthermore, the field devices need to be within the line of sight of the satellite, since they must typically have overt, high gain electromagnetic reception devices such as dishes or long antennas. These systems, too, are thus impractical for certain applications.

Consider the set of problems faced by the manager of a fleet of rental cars. The assets for which the manager is responsible are highly mobile—indeed, they can be located virtually anywhere in the continental United States. The assets are also easily stolen and thus expensive to insure. They can become unproductive when a rental customer fails to return a vehicle to its proper location. Rental cars can also become 'lost' when there is poor communication between retail outlets, and valuable up-time of the rental asset is then squandered.

Another issue important to managers of rental fleets is the safety of their customers. Rental car drivers, and in fact, all drivers, could benefit from a system would summon emergency assistance at any time, from any location, without leaving the vehicle.

Analogous problems existing in other industries. For example, there is increasing pressure on the railroad industry to move towards scheduled service, thereby facilitating just-in-time delivery, in an effort to better compete with the trucking industry. To achieve this goal, the manager of a railroad system would ideally be able to quickly determine the location of each and every rail car on a regular basis, no matter where the rail car is located. Optimum routing and delivery time could then be accurately predicted.

In both of these fleet management applications, the fleet manager would very much like to be able to query a remote device, in order to determine its location, but at minimum cost. Existing systems do not fulfill this need—for example, current cellular telephone service carries with it relatively high connect time charges, roaming charges, and monthly service fees, and fleet managers do not consider such systems to be cost effective.

Other industries, such as the trucking and shipping industries, could also benefit from the ability to inexpensively and accurately track the location of shipping containers no matter where they are located. Any one shipping container may hold thousands or potentially millions of dollars of valuable goods, and clearly, those responsible for the well being of the goods in transit would like to know where they are at all times.

Similar demands are made in remote meter or sensor reading, facility monitoring, security, buoy monitoring, and other applications.

One way to provide low cost, long haul communications service is by using short wave radio links that operate in the High Frequency (HF) radio band, which ranges from approximately 3 to 30 MegaHertz (MHz). Radios which operate in this band have been in use for many years, and the required transceiver equipment is inexpensive to maintain and operate. Signals transmitted at HF frequencies can be carried for hundreds or even thousands of miles. However, there are certain well-known difficulties which make HF radio transmission unreliable. A first problem is rooted in the fact that HF provides long distance, over the horizon communication by bouncing the signal off of the earth's ionosphere. Due to multiple atmospheric conditions, a phenomena which changes depending upon location, time of day, time of year, and sun spot activity levels, different portions of the 3–30 MHz spectrum may or may not propagate in different directions at any given time of day. Thus, in order to provide reliable communication, the transmitting radio must make some accomodation for the fact that a chosen carrier frequency in the HF band may or may not be propagating between itself and the receiver.

Secondly, of those frequencies which are propagating, the transmitter and receiver must know also which frequencies are clear, that is, which frequencies are not in use by other equipment operating in the same band. This problem is not as easy to solve as it may seem. While certain frequencies in the HF spectrum are dedicated in advance to certain known users, many other frequencies in the HF band remain available for on-demand use. Thus, it cannot be predicted with certainty when these frequencies will or will not be occupied at any instant in time.

Traditionally, HF communication systems have depended upon trial and error to find a frequency which is both propagating and clear. These systems thus only provide minimum reliability in terms of the probability of establishing a link from the transmitter to receiver exactly when that link is desired.

More advanced systems improve reliability by using "sounder" techniques together with automatic link establishment (ALE) algorithms. In those systems, the base station transmits on multiple frequencies, and the remote receivers listen on the same multiple frequencies. When the remote hears the base station, it knows that the frequency that is heard was propagating. The remote then transmits on that frequency as soon as the base completes its transmission, before the frequency can be occupied by another user.

Unfortunately, even ALE-type systems have several drawbacks. First, they are spectrally inefficient, since the base stations must broadcast on several frequencies. Second, the remote units are more expensive than would otherwise be required, because they need to contain frequency agile HF receivers as well as an HF transmitter. The system capacity, in terms of how many remote units can be supported, is limited because of the need to transmit on multiple frequencies at the same time.

Finally because a single central HF base station coordinates the use of the outbound links, the geographic coverage of such a system is limited to that which can be provided by a single base station and reliability is minimized if that base station is not in a region that is condusive to propagation.

DESCRIPTION OF THE INVENTION

OBJECTS OF THE INVENTION

It is an object of this invention to provide a long distance data communication system in which relatively small amounts of data can be retrieved from very remote or highly mobile sources only on an infrequent basis, but in near real-time, at minimum cost.

Another object is to provide highly reliable communication while minimizing interference with other communication systems that may be operating in the same band.

The system should provide two-way communication, that is, it should be possible to communicate from a base station to a remote field unit, and well as from the field unit back to the base station.

Yet another object of this invention is to provide ubiquitous coverage over a wide geographic area, such as the continental United States, while requiring a minimum of capital expenditures for new infrastructure.

In addition, such a system should make use of simple and economical field devices, costing far less than, for example, a comparable satellite data terminal.

The field units should not require direct line of sight with a base station unit for communication to be successful and reliable.

The field units should also be able to operate on battery power, eliminating the need for external power supplies as typically required for satellite-based systems.

Finally, the use of the system should cost the customer far less than existing paging, cellular, and satellite systems.

SUMMARY OF THE INVENTION

Briefly, the invention is a communication system that provides ubiquitous wireless data communication services, such as throughout the continental United States, by using a network of only a few, widely distributed radio base station sites. The radio base stations receive data from remote or mobile field units using long distance, well-proven radio technology such as that operating on short wave carrier frequencies including, for example, the High Frequency (HF) radio band.

A network hub or mission operation control (MOC) unit controls the radio base station sites and the field units from a central location. The MOC receives information from a Propagation Analysis Processor (PAP) which maintains a database of probabilities that a signal at a given frequency will propagate between each of a number of radio base station sites and each of many possible remote locations.

The MOC also receives information from a Frequency Analysis Processor (FAP) associated with each radio base station, which indicates the HF frequencies that appear to be clear and thus available for burst transmission.

When a customer uses a calling station to request access to a remote field unit, the MOC first determines an available HF frequency and timeslot for a particular field unit to transmit. This determination is made from both the propagation probability data reported by the PAP as well as from the clear frequency data reported by the FAP.

The MOC then issues an outbound message to the field unit, requesting the field unit to report back whatever information it may have. The outbound request message may be transmitted to the remote field unit using any inexpensive wireless infrastructure, such as the existing one-way paging network infrastructure. The outbound message may also be communicated by other types of sub-systems, such as cellular, satellite, or other radio transmission means.

When the field unit receives the outbound message, it collects data to formulate an inbound response message, such as by reading data from its associated geolocation receiver, or by reading other data that is available to it. The field unit then sends its response as an inbound message back to the radio base stations at the indicated HF carrier frequency and time, in the form of a short duration burst message.

In one preferred embodiment, the inbound message may be broadband-encoded with a scheme such as spread spectrum modulation, to minimize the probability of interfering with other communications at nearby frequencies.

The system of the present invention thus consists of several different sub-systems, including the calling stations, the missions operation center (MOC) including the Propagation Analysis Processor (PAP), the outbound signaling network, the remote field units, and the inbound radio base station network including the Frequency Analysis Processors (FAPs).

The calling stations provide an interface for the customers of the system, including a platform such as a personal computer and modem, for accepting a request from customers for communication with a particular remote field unit, reporting the request to the MOC, receiving the field unit's report from the MOC, and then displaying the report to the customer. The calling stations are connected to the MOC through any convenient method, such as by a modem connected to the public switched telephone network (PSTN).

The MOC, which is also a computer, performs a number of tasks. It accepts requests for communication with the field units from the calling stations and forwards the response of the field units back to the calling stations.

The MOC also provides a central selection point for the frequencies to be used for the inbound messaging link. This is done by periodically communicating with the PAP, to augment a table of available frequencies with propagation probabilities for each radio base station from each of many possible remote locations.

The MOC also receives reports of available inbound link radio frequencies from the FAPs and maintains a database of such frequencies and timeslots for which they are available.

The MOC communicates with the radio base stations via modems using appropriate low cost land-based connections such as the PSTN, leased or private telephone circuits, Very Small Aperture Terminal (VSAT) wireless networks, or other cost-effective connections.

In operation, upon receipt of a customer request from a calling station, the MOC selects a frequency from the PAP database which has a maximum probability of propagation to all radio base stations. The MOC then determines whether that frequency was also reported as being a clear frequency by the FAPs. In other words, the clear frequency having the best aggregate propagation probability for all basestations is selected.

The MOC then selects an available time from its database, and formulates an outbound request message with the selected frequency and time as data arguments. The MOC then quickly distributes the outbound request message to the remote field units, in as short a period of time as possible, since the data is highly perishable. That is, the chosen clear channel can quickly become occupied, within a few seconds of its first identification.

The outbound message is then forwarded to the outbound signaling link, with a request that the outbound message be sent to the field unit. This request to the outbound signaling link is typically sent via any convenient land-based media, such as the PSTN, VSAT, or other type of data communications network.

In a first mode, the outbound message may be sent to the field unit by an addressable signaling link such as a paging center which is capable of alerting a particular remote unit. In a second mode, a list of frequency and time slot pairs may be broadcast to any number of remote units in the system. In such a mode, any remote unit wishing to complete a call listens for the outbound message broadcast and then randomly selects, from among the several choices, a frequency and time at which to attempt to complete the inbound call.

In either mode, the MOC then alerts one or more of the associated base stations to expect a response from the indicated field unit at the specified frequency and time. Upon receipt of an inbound message from one or more of the radio base stations, the MOC then forwards the information in the message back to the calling station.

The MOC reports the successful transmission to the PAP. In the event that the inbound message was not received at the expected time and frequency, the failure to communicate is reported to the PAP.

A different frequency and time are then chosen by the MOC, and another attempt is made to communicate with the field unit.

The radio base stations perform several functions. First, to assist in the MOC's determination of which frequencies are unoccupied, each radio base station includes a Frequency Analysis Processor (FAP) which periodically checks each possible inbound link channel to determine if the channel is in use. This may be done, for example, by using an available radio receiver and continuously scanning the HF band, measuring a receive power level in each channel, such as in each bandwidth of 3 kHz.

An estimate of the receive power level may also be made by sampling subbands in each channel and integrating the detected signal power level in the subbands over time.

In either event, the FAP identifies available, clear channels. This can be done by comparing the power level in each channel with a threshold background noise level, in in other ways. Regardless of the technique used to identify the clear channels, the FAP then periodically outputs this list of clear channels to the MOC so that the MOC can maintain its own frequency selection table.

In addition, the FAP may remove from the list of clear frequencies any frequencies known to be pre-allocated for specific uses by regulatory agencies such as the FCC which are to be avoided. For example, certain well-known sounders in the HF band, such as broadcast stations like WWV, are removed from the list.

To effectuate reception of the inbound messages from the field units, the radio base stations also include a pool of tunable HF receivers and modems. Upon accepting a command from the MOC to expect an inbound message from a particular field unit at a particular frequency and time, each base station then allocates an HF receiver and modem from the pool, waits for reception of the inbound message, and then formulates a report back to the MOC.

For example, if a inbound message is received successfully from the field unit, the data from the inbound message is reported back to the MOC as the response message. If, however, no inbound message is received at the indicated time and frequency, a failure of the inbound link is reported back to the MOC.

The propagation analysis processor (PAP) is typically located at a central site such as the same site as the MOC. The PAP estimates the probability for which an inbound signal will be received correctly at each radio base station, preferably by using both analytic ionospheric prediction models as well as by using real time inputs which correspond to the observed performance of the system.

The model for each radio base station location is a database, or table, of time of day versus frequency with an expected propagation being determined for a signal transmitted from a number of remote locations across the expected service area to each of the radio base stations. The propagation model may be initially created using known ionospheric modeling software such as the IONCAP software developed by Link Corporation of Binghampton, N.Y. This modeling software, when given a remote location and a basestation location, an estimate of expected solar activity, time of day, and antenna pattern, can mathematically predict which frequencies will propagate, that is, the model provides a probability of actually receiving a signal from the remote location at the basestation location.

As actual data is received concerning the successes or failures of specific field units at particular radio base station locations, the propagation model is then updated. The updates may be made, for example, by using a weighted average of the old propagation data and new observed propagation data.

Periodically, the propagation model may be reset by re-running the ionospheric modeling calculations, such as on a daily basis.

The propagation model may also be updated using data from known transmitters at known frequencies, such as the WWV transmitter in Ft. Collins, Colo., as well as by using sounding receivers at each basestation together with known sounding tranmitters or known field units.

The field units each receive an outbound message signal containing data representing an identification tag specific to that field unit, and a frequency and a time at which the field unit is to originate the inbound message. Other data may also be included in the inbound message, as dictated by the particular application for the system. Upon receipt of such an inbound signal, the field units collect data to be reported back to the MOC, such as latitude and longitude from a geolocation system, or data inputs from other sensors or equipment connected to the field unit. The field unit then generates the inbound message from these inputs and transmits the inbound message at the specified frequency and time, over the HF link, to the radio base stations.

A communication system according to the invention provides several advantages.

The system is highly reliable. It determines, in advance, by polling each of the radio base stations in the inbound messaging network, a clear transmission frequency having a high likelihood of propagating to each of the base stations. The system permits relatively small amounts of data to be reliably retrieved from very remote or highly mobile sources in near real-time, at minimum cost.

By not fixing frequency allocations in advance for the system, the system can dynamically adapt as changes in ionospheric conditions and system utilization demands effect which frequencies are available and most likely to result in a successful transmission.

Ubiquitous coverage over a wide geographic area such as the continental United States is possible, such as when paging systems are used for outbound messaging.

The use of non-HF networks such as paging networks for the outbound link not only eliminates the need for a complex frequency agile HF receiver at the field unit site, but also dramatically increases the number of field units that can be supported.

The system requires a minimum of capital investment for new infrastructure when such existing systems and networks are used.

The system is spectrally efficient, since there are no high powered sounding transmitters required. It is also as unintrusive as possible, as it only uses frequencies which appear to not be in use by other systems at any given time. In addition, by sending only short duration messages, on the order of a few seconds or so, it is insured that even if a frequency which is in use by another system is inadvertently chosen, such interference is minimized.

The field units may operate on battery power, much as conventional paging receivers, since the transmit unit is only activated infrequently, and even then, only for a short duration burst inbound message.

BRIEF DESCRIPTION OF THE DRAWINGS

The above and further advantages of the invention may be better understood by referring to the following description in conjunction with the accompanying drawings in which:

FIG. 5 is a block diagram of an RBS control unit showing several databases that it maintains;

FIG. 6 is a flowchart of the operations performed by a Frequency Analysis Processor (FAP) portion of the RBS to periodically update a database of available frequencies;

DETAILED DESCRIPTION OF A PREFERRED EMBODIMENT

Figure 1:
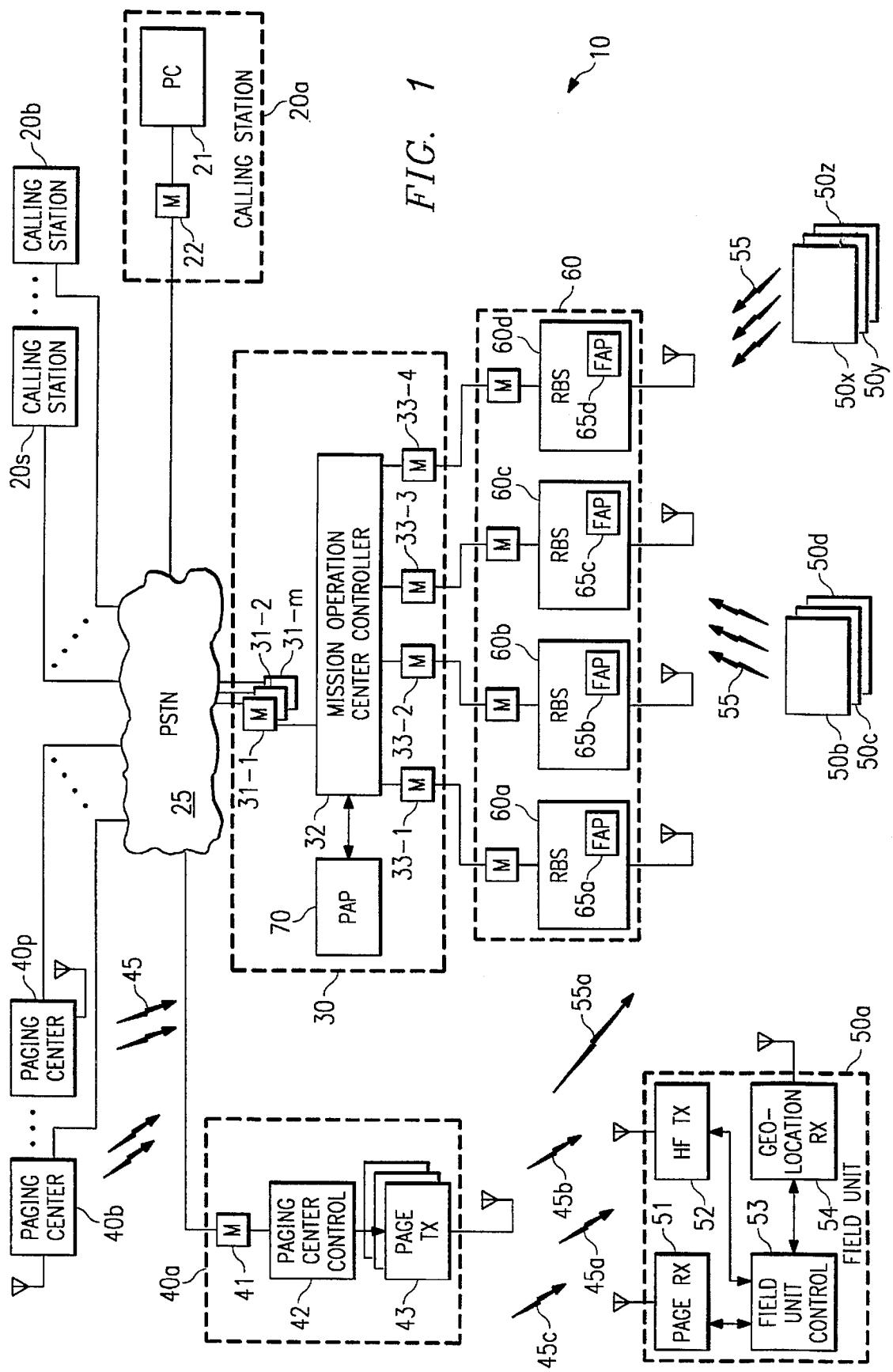
FIG. 1 is a block diagram of a two-way radio communication network according to the invention.

Turning attention now to the drawings, FIG. 1 illustrates a block diagram of a two-way wireless communications system 10 according to the invention. The system 10 includes a number, s, of calling stations 20a, 20b, . . . , 20s (collectively, calling stations 20), a data communication mechanism 25, a mission operation center (MOC) 30, a number, p, of geographically dispersed outbound messaging sub-systems 40a, 40b, . . . , 40p which cover a wide geographic area such as the continental United States or Europe, multiple mobile or remote field units 50a, 50b, 50c, 50d, . . . , 50x, 50y, 50z, and an inbound messaging sub-system which may make use of a number, such as approximately four, of radio base stations (RBSs) 60a, 60b, 60c, and 60d, which are also geographically dispersed to provide ubiquitous coverage.

Also in accordance with the invention, the system 10 makes use of a Propagation Analysis Processor (PAP) 70, which maintains an estimate of the probability of a successful transmission at each frequency for each basestation from each of many possible remote locations, as well as a set of Frequency Analysis Processors (FAPs) 65, which continuously determine which radio frequencies are clear at each basestation 60.

The MOC 30, making use of data maintained by the PAP 70 and FAPs 65, determines on a per-call basis, a frequency to be used by the field units 50 when communicating with the radio base stations 60.

This process will be discussed in detail below, but is helpful to first understand the various components of the system 10 and how they interact.

More particularly now, a customer of the system 10 initiates a request for communication with a particular field unit 50 using the calling station 20a. The request is then forwarded to the MOC 30 over the data communication network 25. The data communication network 25 may preferably be a public switched telephone network (PSTN), as shown. However, private networks, Very Small Aperture Terminal (VSAT) networks, and other types of communication networks may be used.

The MOC 30, in turn, forwards the request to one or more of the outbound messaging systems 40. The outbound messaging systems 40 provide radio links 45a, 45b, . . . ,45z which are used for communication from the system 10 to the remote field units 50. These radio links are referred to collectively as the outbound links 45. In a preferred embodiment, the outbound links 45 may be provided by multiple paging sub-systems 40. However, other systems such as nationwide paging systems, satellite networks, private radio networks and the like can be used to provide the outbound links 45. Thus, while the outbound messaging system 40 may be referred to in some instances here as a paging system, it should be understood that other types of outbound radio links may be used as well.

Radio communication from the field units 50 back to the system 10, which are implemented using the network of RBSs 60, are referred to as the inbound links 55a, 55b, . . . .55z. The inbound links 55 may use spread spectrum encoded, short wave radio links operating in the high frequency (HF) radio band, or other modulation types.

It is the purpose of the PAP 70 as well as the FAPs 65a, 65b, 65c, and 65d to assist the MOC 30 in determining radio carrier frequencies, or channels, to be used to establish the inbound links 55. In particular, the MOC determines a frequency and time for the field unit 60 to use which is reported by the PAP 70 as having a maximum probability of successful propagation between the last known location for the field unit 50 to each of the RBSs 60. In addition, the MOC 30 insures that the chosen frequency was reported as being clear by at least some predetermined number of the base stations 60.

To coordinate use of the inbound links 55, the outbound message on outbound links 45a consists of data indicating the frequency thus determined by the MOC 30 and a time at which a particular remote field unit such as unit 50a may signal the radio base stations 60 with its information.

At the indicated time and frequency, a message is received from the field unit 50a by one or more of the base stations 60, and the message is then forwarded to the MOC 30. The MOC 30, in turn, then supplies the requested data to the customer at calling station 20a over the network 25.

As a result, a wireless communications system 10 according to the invention permits reliable communication on a near real-time basis across a broad geographic area such as may be conveniently covered by a network of only a few short-wave radio base stations 60.

Because the system 10 determines a frequency in advance which is likely to propagate and which is presently clear, reliability in even noisy environments such as HF is possible.

The system architecture also eliminates the need for costly, custom and ubiquitous or expensive infrastructure as now required by cellular and other terrestrial systems as well as satellite-based systems. For example, existing paging sub-systems my be used to provide the outbound links 45, and the network 25 may be the public switched telephone network. The inbound links 55 are provided by well-proven HF radio technology. The system is thus far more maintainable and less expensive to support then competing cellular, multicast paging, or satellite systems.

In addition, the radio systems in the remote field units 50 operate only when a customer initiates a request for data from a calling station 20. Thus, not only is interference with other systems minimized, but also the field units 50 can be designed to operate with minimal standby power, as is available from a battery or by solar power, which is ideal in remote locations for which access to external power is not readily available, reliable or secure.

Because the radio base stations 60 use short-wave HF signaling, a direct line-of-sight is not required between the radio base stations 60 and the remote field units 50, and thus the system 10 will operate properly even in situations where direct line-of-sight propagation is not possible, such as in stacked containers or in densely populated urban areas. The system 10 thus exhibits greater availability and applicability than competing satellite-based systems.

Before proceeding to a discussion of the PAP 70 in particular, each of these components of the communication system 10 will now be discussed at a greater level of technical detail in order that one of skill in the art may more readily understand how to build and operate the system 10.

Message Formats (FIGS. 2A through 2D)

Figure 2A:
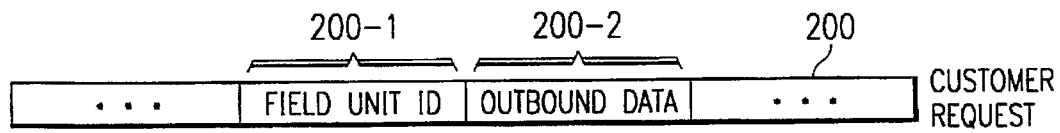
FIG. 2A illustrates the format of a message sent by a customer of the system from a calling station to a mission operation control (MOC) unit.

The format of a message 200 sent from the calling station 20 to the MOC 30 is shown in FIG. 2A. At a minimum, the message 200 includes at least one data field 200-1 indicating a identification (ID) code for the field unit 50a from which the customer is requesting data. In addition, however, other data to be sent to the field unit 50a from the calling station 20a may be contained in one or more outbound data fields 200-2.

Figure 2B:
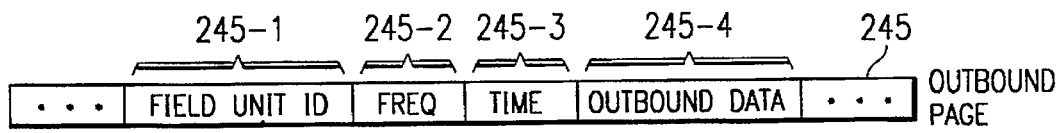
FIG. 2B illustrates the format of an outbound message sent from the MOC to a field unit using a paging network.

FIG. 2B shows the format of an outbound message 245 sent over the outbound links 45 to the field units 50. The message 245 consists of a field unit ID code 245-1 and outbound data 245-4 as originated by the calling station.

In addition, the message 245 includes a frequency field 245-2 and time field 245-3 indicating a transmission frequency and a time of day at which the remote unit 50a is to signal the RBSs 60.

Figure 2C:
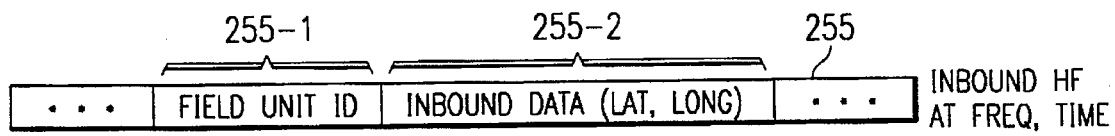
FIG. 2C illustrates the format of an inbound response message sent from the field unit to a remote base station (RBS) at a particular time and frequency within a shortwave radio band, as forwarded from the RBS to the MOC.

FIG. 2C shows the format of the inbound message 255 returned by the field units 50a over the inbound links 55, including a field unit ID field 255-1 as well as inbound data field 255-2 containing data being returned from the field unit 50a. Such inbound data 255-2 may, for example, in the case of a mobile field unit 50, include information concerning the position of the field unit in latitude and longitude form.

However, it should be understood that the field unit 50 may be stationary and/or that other types of inbound data 255-2 may be sent, depending upon the customer's application.

Figure 2D:
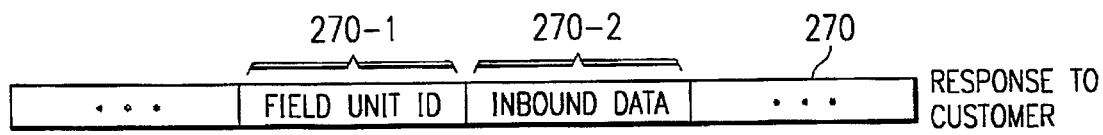
FIG. 2D illustrates the format of the inbound message as sent from the MOC back to the calling station.

Finally, FIG. 2D illustrates the format of the message 270 sent by the MOC as a response to the calling station 20a. The message 270 includes the field unit ID 270-1 if necessary, as well as the inbound data 270-1 returned.

It should be understood that the illustration of the message formats in FIGS. 2A through 2D is not restrictive, and that the various fields 200-1, 200-2, 245-1, . . . ,255-1, . . . , 270-1, 270-2 may occur in any order in each respective message. Each message 200, 245, 255, and 270, will also typically have additional fields such as header fields, checksums, routing or synchronization information and other fields as normally required in any message communication system.

Calling Stations 20

As mentioned above, the calling stations 20a, 20b, . . . , 20s provide an interface for customers to interact with the system 10. A typical one of the calling stations 20a is embodied as a personal computer (PC) 21 having an appropriate standard, well-known communications device such as a computer modem 20-2 to exchange messages with the MOC 30 over the PSTN 25. The MOC thus also has a bank of computer modems 31-1, 31-2, . . . , 31-m to communication with multiple calling stations 20. The message requesting communication with a particular field unit 50a thus typically travels from the calling station 20a to the MOC 30 via temporary dial-up connection over the PSTN 25.

Mission Operation Center (MOC) 30

The MOC 30 includes a computer, referred to as the mission operation center (MOC) controller 32, and multiple modems 31-1, 31-2, . . . , 31-m, 33-1, 33-2, . . . , 33-4.

The MOC uses the modems 31 for communicating over the network 25 with at least the calling stations 20 and paging centers 40.

The MOC may also preferably use other modems 33-1, 33-2, 33-3, and 33-4 to communicate with the radio base stations (RBSs) 60. However, because the MOC needs to communicate frequently with the RBSs, and since there are only a handful, such as four RBSs, the MOC may also use modems 33 which are connected to dedicated telephone circuits such as leased lines, packet switch networks, or other cost-effective, high data-rate longline services.

As mentioned above briefly, upon receiving the customer request message 200 from one of the modems 31, the MOC controller 32 determines a propagating and clear frequency using data from the PAP 70 and the FAPs 65, and then issues an outbound message 45 containing data indicating that frequency as well as a time for the field unit to use for its response. The MOC controller 32 then retrieves the inbound data from RBSs 60, and forwards the inbound data to the indicated calling station 20a.

Figure 3:
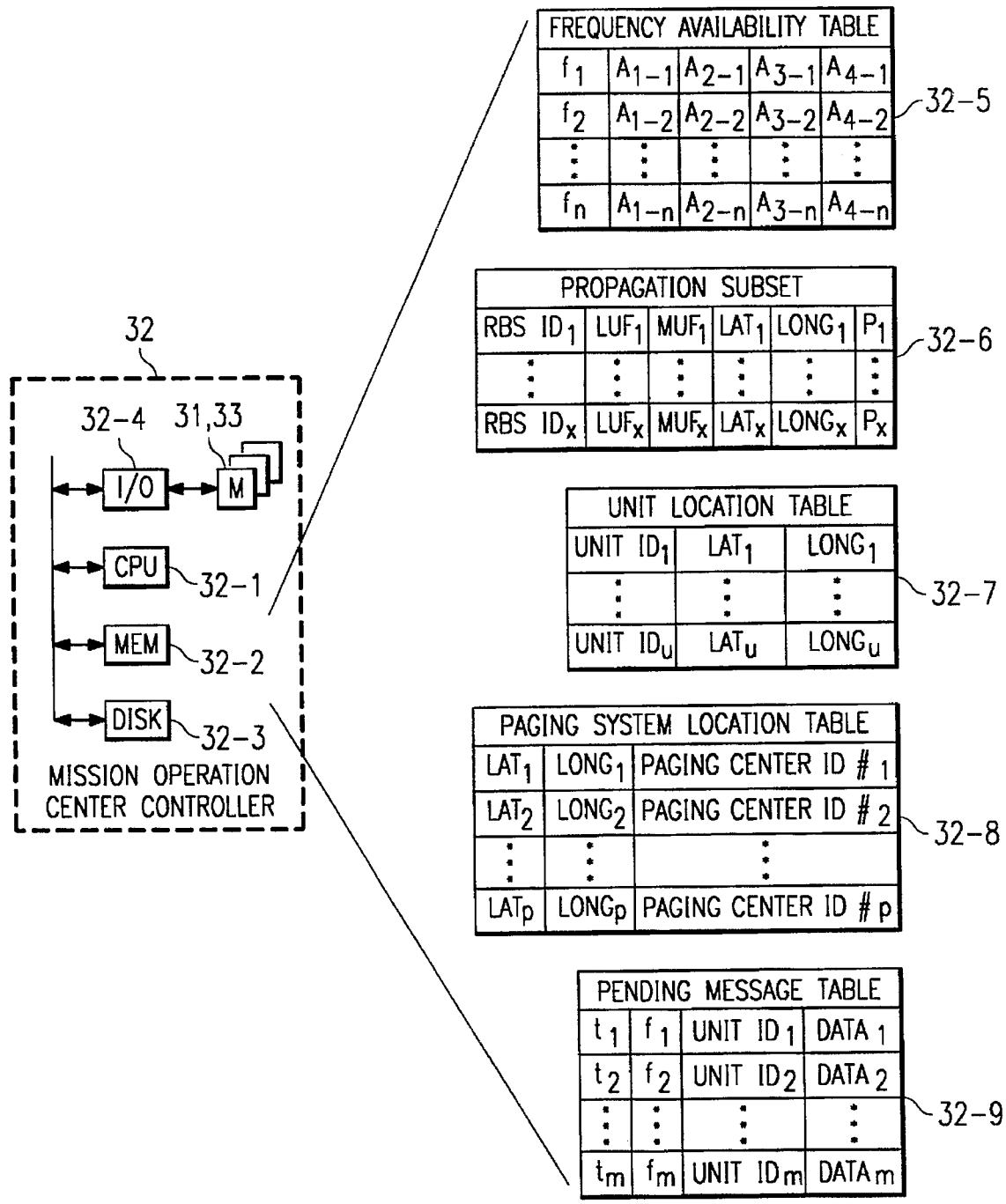
FIG. 3 is a block diagram of a MOC control unit showing several databases, or tables, maintained by the MOC.

FIG. 3 shows a more detailed block diagram of the MOC controller 32 and the various databases 32-5, 32-6, 32-7, 32-8, and 32-9 that it maintains in order to complete these tasks.

The MOC controller 32 includes the usual components of a computer system such as a central processing unit (CPU) 32-1, memory 32-2, disk storage 32-3, and input/output (I/O) interface 32-4. The modems 31, 33 communicate with the MOC via the I/O interface 32-4. Because the MOC controller 32 is primarily responsible for coordinating communication between a number of different devices, the architecture of the computer system is chosen to be an appropriate interrupt-driven or multitasking system.

In order to determine the frequencies to be used by the field units 50, the MOC maintains a first database referred to as a frequency table 32-5. This table includes a number of entries, n. An exemplary entry in the table consists of a frequency, $f_a$, and a set of four noise power amplitudes $A_{a,1}$, $A_{a,2}$, $A_{a,3}$, $A_{a,4}$, associated with each of the four radio base stations 60a, 60b, 60c, and 60d. An entry in table 32-5 is made for each of a set of frequencies in the HF spectrum. These frequencies are taken from the set of clear frequencies reported to the MOC controller 32 by the FAPs 65 as being clear. Since clear and propagating frequencies are used for a single communication, the entries in the table 32-5 change dynamically.

The precise manner in which each FAP 65 determines an available frequency is discussed in detail below. It suffices here to say that a given FAP, such as FAP 65a associated with RBS 60a (FIG. 1), periodically reports a list f1, f2, . . . , fn of available frequencies, or open channels, that the RBS 60a is presently seeing, and a noise amplitude level A associated with each such frequency. Likewise, the other RBSs 60b, 60c, and 60d also periodically report their respective list of frequencies and amplitude levels.

As described below, the MOC controller 32 also uses propagation probability factors from a model maintained by the PAP 70 which makes use of known ionospheric modeling algorithms together with actual system experience data in the process of selecting frequencies. A subset of the data maintained by the PAP 70 may be kept in a second table 32-6 in the MOC memory 32-2. Each entry in the table 32-6 consists of a radio base station (RBS) location, a range of propagating frequencies, for example, such as specfied by a lowest usable frequency (LUF) and a maximum usable frequency (MUF) or in some other way, a remote location in latitude (LAT) and longitude (LONG), and a propagation factor, P.

A third table 32-7 is preferably used to keep track of the last known location of each deployed field unit 50. Each entry in this table 32-7 consists of a field unit ID code, and position information as last reported by the field unit, such as a latitude (LAT) and longitude (LONG). The MOC controller 32 maintains and updates this table 32-7 as field units 50 are enabled or removed from service, and as inbound messages are returned by each field unit indicating its latitude and longitude.

As mentioned above, in the preferred embodiment, the outbound links 45 are provided by several paging subsystems 40. A fourth table 32-8 is thus used for paging sub-system location data. Each entry in this table contains a range of latitudes and longitudes covered by the paging sub-system, as well as an identification code for each paging sub-system associated with the system 10. This table 32-8 is updated whenever arrangements for the use of various paging systems are made by the operator of the system 10. The table 32-8 may also include details of how the MOC controller 32 can access each different paging system, such as modem telephone numbers, protocol types, and the like.

It should be understood that the table 32-8 is not needed if a nationwide multicast paging network is used to implement the system 10; however, if the system 10 does keep track of the field unit 50 location and does make use of conventional paging systems 40, it can offer its service at low cost.

A final table 32-9 is a pending message table. The entries in this table include data concerning each message in transit to one of the field units 50, such as a field unit ID, the assigned time, t, and frequency, f, at which a response is expected, and other data that may be necessary to avoid conflicting assignments of access to the available channels.

Figure 4:
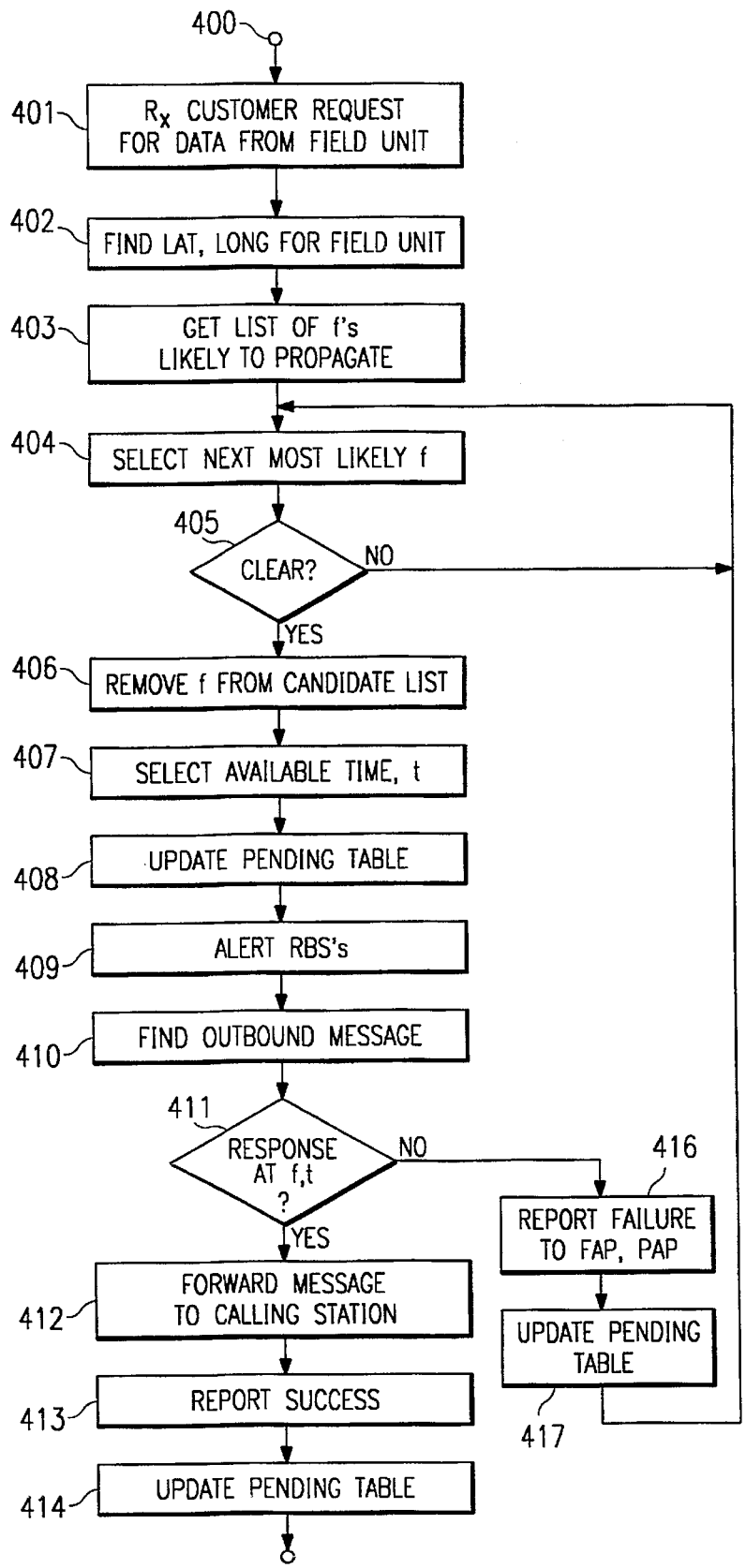
FIG. 4 is a flowchart of the operations performed by the MOC upon receipt of a customer message requesting data from a particular field unit, and the operations performed to generate the outbound page message.

FIG. 4 is a detailed flowchart of the operations performed by the MOC controller 32. Upon receipt of a request from a customer to communicate with a remote unit 50 in step 401, the MOC first proceeds to determine an HF frequency to be used for the inbound link 55.

In step 402, a last known latitude and longitude are determined for the field unit 50a indicated by the request message from the calling station 20a. This latitude and longitude can be determined by using the field unit ID 200-1 which was part of the customer request message, and performing a table look-up in the unit location table 32-7.

Next, in step 403, a set of frequencies likely to propagate from the indicated latitude and longitude are determined. This is done by performing another table look-up in the propagation subset table 32-6, to determine a propagation probability, p, for each of the RBSs 60 from a latitude and longitude which is closest to the expected latitude and longitude of the field unit 50a of interest.

The frequency with the highest expected overall probability of success is then selected, in step 404, by comparing a sum of the probabilities for each RBS 60.

It should be understood that more sophisticated techniques may be used, such as by calculating a weighted sum of the probabilities, P. In particular, if the MOC controller 32 maintains the table 32-7 of last known field unit locations, it can thus determine which RBS is most likely to receive the message from the field unit 50, assuming the field unit has not moved too far from its last known location. The MOC controller 32 can thus weight the probability associated with the most likely RBS more heavily than the probability associated with the other RBSs.

Next, in step 405, the MOC controller 32 selects one of the available HF link frequencies which have been reported as being clear in some or all of the radio base stations by the FAPs 65. This determination is made by comparing information in the frequency table 32-5.

Other techniques may be used to refine the frequency selection process. For example, the MOC controller 32 may permanently exclude from the frequency selection process as necessary designated portions of the HF radio spectrum known to contain fixed transmitters or known interferers.

If a clear frequency cannot be found, control returns to step 404 to select the frequency having the next most likely probability of propagating.

In step 406, the chosen frequency is then removed from the available frequency table 32-5. The system 10 is thus designed so that the MOC controller 32 utilizes the chosen frequency within several seconds, and then abandons it, to avoid interference with other users of the HF spectrum. Minimizing the time between observing a clear frequency and then selecting it for transmission is also key to successful communication, and is the reason why the FAPs are requested to report back to the MOC, to enable continuous updates of the available frequency table 32-5 in real time.

In designing the system 10, a computer model of the probability of the occurrence of a conflicting use in the European environment was made. The European environment is typically much more demanding than the average environment in the United States. The table below shows the probability that a frequency will be utilized by another conflicting user after the system has identified it as clear and before the transmission has occurred.

| Elapsed Time From Frequency Choice | Interference Probability |
| --- | --- |
| 3 seconds | 0.01 |
| 10 seconds | 0.03 |
| 30 seconds | 0.10 |
| 1 minute | 0.15 |
| 6 minutes | 0.63 |

The above table can thus be used to determine how often the available frequency table 32-5 should be updated, depending upon a desired probability of interference with the inbound link.

In any event, in step 407, the pending message table 32-9 is consulted to determine a free time, t, for the selected frequency.

Once the time is selected, a new entry in the pending message table 32-9 is made for the current outbound message 245, in step 408.

Next, in step 409, the RBSs 60 are alerted to expect an inbound message 255 at the determined frequency, f, and time, t.

In step 410, the MOC forwards the outbound page message 245 to the appropriate paging center. In particular, knowing the last latitude and longitude for the target field unit 50a from the field unit location table 32-6, the identity of the paging system nearest to the last known location of the field unit 50a is determined, by searching the entries in the paging system location table 32-8.

The outbound page message 245 containing the indicated frequency, f, and time, t, is then forwarded to the expected nearest paging system, requesting that the remote unit 50a be paged. This request to the paging system 40a is then sent over the network 25 (FIG. 1).

In step 411, the MOC controller 32 then waits for a response from the field unit 50a to be reported by the RBSs 60 shortly after the indicated time, t. Of course, given that the controller 32 is interrupt-driven or multitasking, in actuality, the controller 32 may perform many other tasks, such as servicing requests from other customer calling stations 20, while waiting for the response from unit 50a.

In the event that the outbound message 245 does elicit a proper response, in step 412 the inbound data from the unit 50a is then reported to the calling station 20a in the form of the response message 270.

The fact of a successful message is also reported back to the PAP 70, in step 413, so that the PAP 70 can update its propagation probability model. In step 414, the corresponding entry in the pending message table is also removed.

In the event that the outbound message 245 does not elicit the expected response back from the field unit 50a, the MOC controller 32 assumes that the attempt to communicate the message failed. In step 416, the controller 32 reports this failure to propagate back to the PAP 70, which in turn, updates its model.

The pending message table is then updated by removing the corresponding entry, in step 416, and the MOC controller 32 then returns to step 404, to try to forward the outbound message once again.

Outbound Radio Links 45 and Inbound Radio Links 55

Returning to FIG. 1 briefly, all outbound links 45 preferably utilize existing FCC licensed communication media, such as the existing paging network 40 infrastructure. However, such outbound links 45 may also be provided by established public or private carriers such as a frequency modulated (FM) subcarrier network paging systems, high frequency (HF) radio networks, or other types of suitable outbound radio links 45, depending upon the nature of the field units 50. For example, if the field units 50 are expected to be located in stacked containers, outbound links 45 must not be implemented using a radio communication methodology that requires line-of-sight. However, if the filed units are, for example, deployed in a remote well-logging application, line-of-sight communication may be adequate.

The inbound links 55 make use of a high-frequency (HF) radio stations 60 making use of a technology which operates with carrier frequencies in the radio spectrum from 3 to 30 MHz. As mentioned above, to establish reliable communication in the HF inbound links from the field units 50 to the RBS network 60, the remote field units 50 are instructed as to which frequency to use in the HF band. In addition, as soon as the frequency is used for one, short duration message, it is then abandoned by the field unit 50.

Paging Network 40

An exemplary outbound messaging sub-system may be a paging system 40a which is a standard paging system that can accept a request for a page from the network 25. As is known in the art, such paging systems 40a include a modem 41 for accepting page requests, a paging center controller 42 which is typically a computer of some type, and a number of paging system transmitters 43-, 43-1, ..., 43-n. Given a page request that includes a paging field unit ID and message, the paging sub-system 40a formats and then broadcasts the outbound page message 245 in the conventional manner. The paging system 40a need not be a two-way system or otherwise require any acknowledgment of receipt of the page from the field units 50.

Field Units 50

Continuing to pay attention to FIG. 1 briefly, an exemplary field unit includes an outbound message receiver such as a paging receiver 51, an HF transmitter 52, a field unit controller 53, and data collection apparatus such as a geolocation receiver 54 or other sensor.

The paging receiver 51 is conventional. The field unit controller 53 is also a conventional control device, such as a microcomputer.

The geolocation system receiver 54 may be one of any known types such as a global positioning system (GPS) or Loran receiver.

Upon receipt of an outbound page message 45, an exemplary field unit 50a transmits an inbound message back to the RBS network 60, such as an inbound message 255 containing its current position or other data. The inbound message 255 is transmitted at the carrier frequency and time which was indicated by the outbound message 245. The transmission time-slots on the inbound communication links 55 may be synchronized using universal time standard data, as may be available from a GPS receiver 54 or other broadcast time standard transmitters.

The inbound HF links 55 thus exhibit non-interfering characteristic behavior, since the remote field units 50 already know, before transmitting, which frequencies are likely to propagate and which are not in use at particular times. The frequency is then quickly vacated after its single use by the MOC controller 32, leaving it available for other uses, such as its regularly licensed use.

In addition, the field units transmit on only one of the open frequencies for a short period of time, of several seconds duration at the most. In one preferred embodiment, the field units 50 use a low-power, spread spectrum HF waveform having a duration of about one (1) to ten (10) seconds. The waveform may, for example, be an eight-level phase shift keyed (PSK) direct spread waveform with a bandwidth of 3 kHz, and a chip rate of about 2400. This provides a data rate of approximately 75 bits per second for inbound messages 255. It should be understood that other types of signal encoding and modulation may be used, however.

Interference to voice users in the HF spectrum is thus minimal since the noise burst from the system 10, even if there is some interference, is similar to a typical HF channel fade. Other users of the HF spectrum, such as data communication users, are also typically equipped to handle second-long channel fades and have typically implemented ARQ schemes or coding interleaving to avoid fading difficulties. Thus, other such users in the HF band should also not notice the existence of the system 10.

Radio Base Stations (RBSs) 60

FIG. 5 is a block diagram of a typical radio base station (RBS) 60-1, consisting of a RBS controller 61, a landline modem 62, a pool of HF modems 63 and HF receivers 64, and a frequency analysis processor (FAP) 65.

The RBS controller 61 is a conventional computer similar to the MOC controller 32. The RBS controller 61 uses the land line modem 62 to exchange messages with the MOC controller 32.

The RBS controller 61 maintains a real time database of available frequency channels such as frequency table 66. Each entry in the table 66 includes an HF frequency, f, and an observed noise level power amplitude measurement, A.

The frequency table 66 is typically maintained by a frequency analysis processor (FAP) 65. The FAP 65 periodically determines the identity of clear operating HF frequencies on a regular basis. The FAP 65 may accomplish this by using a sweeping receiver, a spectrum analyzer, or may step one or more of the tunable HF receivers 64 throughout the HF frequency band under control of a computer or microcomputer.

In most instances, the FAP has a good probability of finding a frequency which is not occupied by another user. Assuming a worst case time of day, such as sunrise, about 2 MHz of HF radio spectrum propagates in any given location. Given an assumption of 30% channel occupancy, which is based upon a empirical observations, the system 10 will typically always have at least 466 channels of the required 3 kHz bandwidth available.

Deployment of the HF modems 63 and associated HF receivers 64 is managed by the RBS controller 61 to monitor reception of inbound messages from the field units at the frequencies and times specified by instructions from the MOC controller 32. To assist in this process, an HF receiver deployment table 67 is maintained. Each entry in this table 67 contains an HF receiver ID, and associated HF modem ID servicing the channel, a busy field, B, indicating whether the HF receiver/modem pair are presently assigned. If the busy field B indicates active status, the entry also contains a frequency, f, and time, t, at which a message is expected for the HF receiver, modem pair, as well as the ID of the field unit expected to send the message.

The HF receivers 64 are adapted to receive the signal generated by the field units 50, which may be spread spectrum or other encoding as has already been described.

FIG. 6 is a flowchart of one of the many possible implementations of the operations performed by a control processor in the FAP 65. From an idle state, in step 601 the FAP determines the identity of a next possible free HF frequency. In step 602, the FAP measures the receive power level at that frequency, and in step 603, if the power level is sufficiently lower than a threshold amount, the FAP updates its internal table 66. In step 604, the process iterates until all of the frequencies are scanned. The frequency scanning typically occurs in small increments, such as 60 Hz, which are much smaller than other bandwidth of the HF signals.

Finally, in step 605, when requested by the MOC controller 32, the FAP 65 forwards the frequency availability information to the MOC controller 32 over the PSTN 25. In particular, the FAP 65 will typically forward set frequencies that were observed to be clear in at least 3 contiguous kilohertz (kHz).

Figure 7:
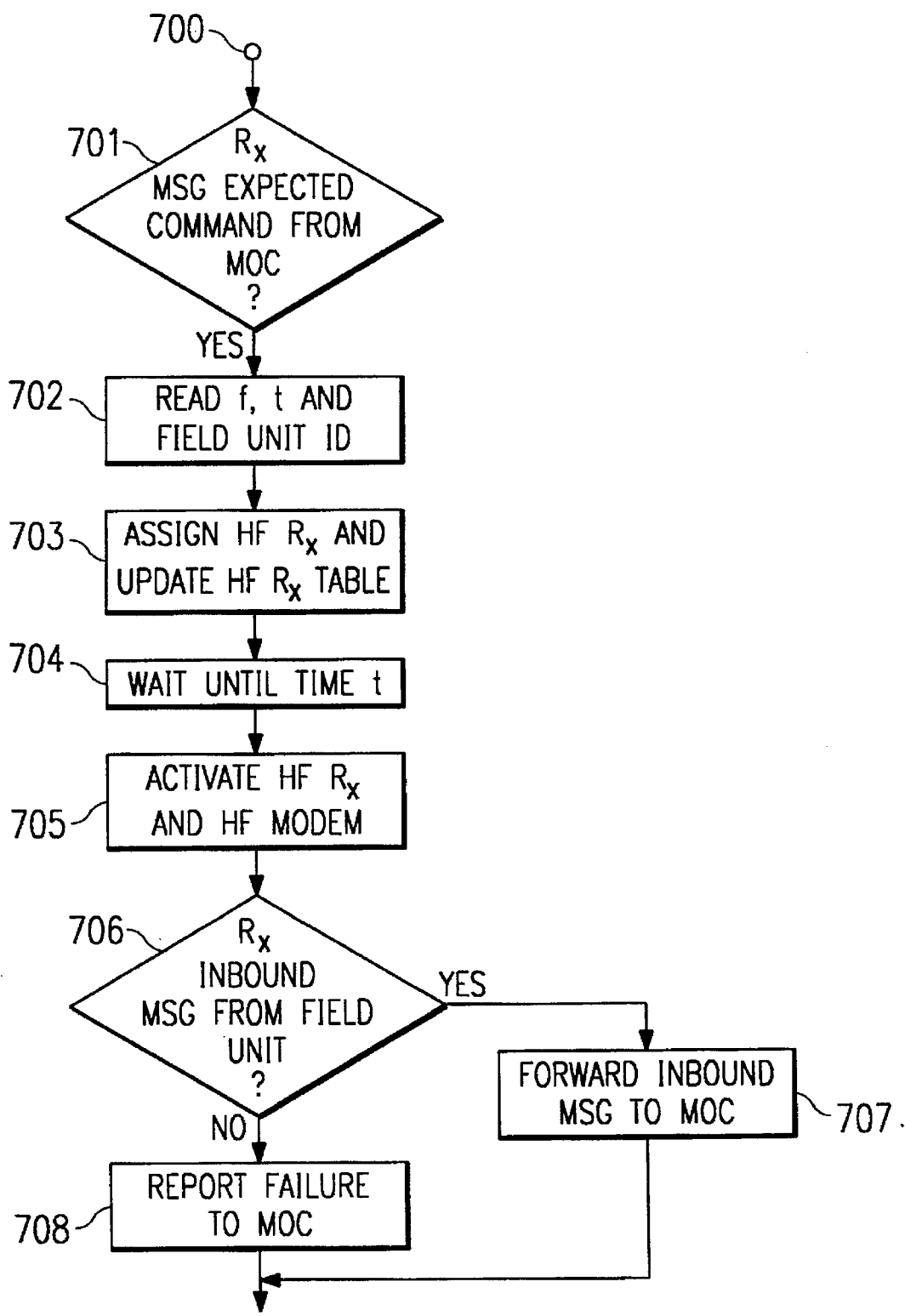
FIG. 7 is a flowchart of the operations performed by the RBS in order to verify reception of the inbound message.

FIG. 7 is a flowchart of the operations performed by the RBS controller 61 to receive an inbound message 255. From an idle state 700, the RBS controller moves to a step 701 when it receives a command from the MOC controller 31 to expect to receive a message from a particular field unit at a particular frequency and time.

In step 702, the frequency, time and field unit ID are read from the MOC message.

In step 703, a free HF receiver and modem pair are identified by examining the local deployment table 67. The corresponding entry is then marked as busy and updated with the frequency, time, and field unit ID information.

The RBS then waits, in step 704, until time t approaches. Shortly before time t, that is, enough time in advance of time t to insure full on status of the chosen HF receiver, the HF receiver and HF modem pair are activated in step 705.

In step 706, it is then determined if an inbound message was received from the indicated field unit 50a at time t. If so, in step 707, the RBS forwards a report message back to the MOC that includes the data from the remote field unit in the inbound message 255, along the land based communication link between the RBS and the MOC, as the inbound page response message 255. If, however, no message is received at the indicated time and frequency, a failure of the link is reported back to the MOC in step 708.

Propagation Analysis Processor 70

Figure 8:
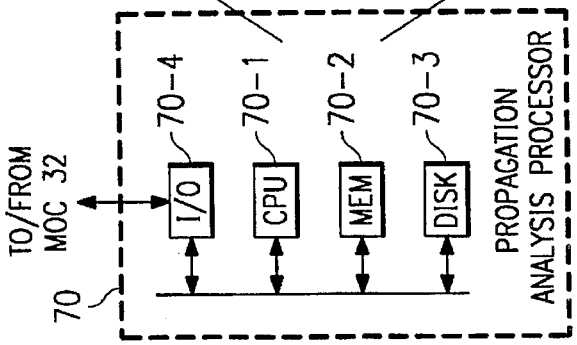
FIG. 8 is a block diagram of a Propagation Analysis Processor (PAP) showing a database of propagation probabilities that it maintains.

FIG. 8 is a block diagram of the Propagation Analysis Processor (PAP) 70. The PAP 70 is another computer consisting of a central processing unit (CPU) 70-1, memory 70-2, disk storage 70-3 and input/output (I/O) interface 32-4. The PAP 70 is preferably located at the same site as the MOC 32, in which case the PAP 70 and MOC 32 may communicate using any type of convenient interface, or may even be implemented in the same processor.

The PAP 70 maintains a set of multidimensional propagation tables 72-1, 72-2, 72-3, and 72-4, with a propagation table associated with each radio base station 60. Each propagation table 72 contains data values estimating the probability for which an inbound signal will be received correctly by that base station from a number of possible latitudes and longitudes, at different times of day, and in each of a number of frequency bands.

Figure 10:
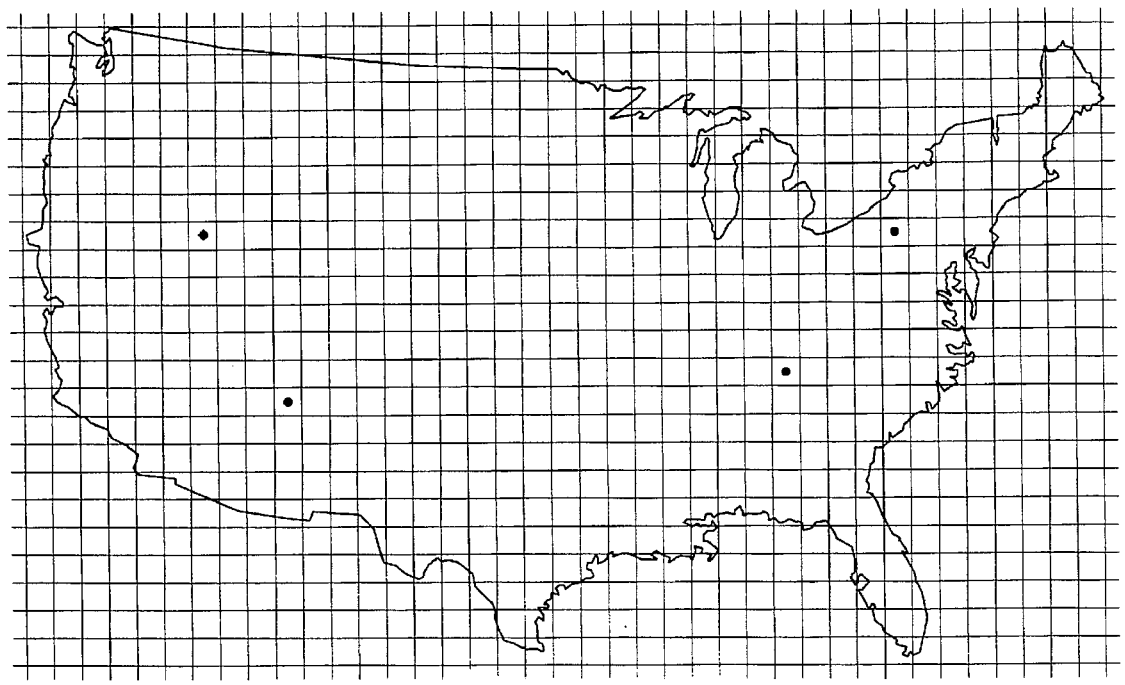
FIG. 10 is a map of the continental United States showing a grid indicating possible latitudes and longitudes used in the model maintained by the propagation analysis processor of FIG. 8.

An exemplary table 72-1 associated with RBS 60a consists of a first entry 73 indicating the latitude and longitude of the RBS 60a. Next, rows 74a, 74b, . . . ,74z are created for each of many possible fields and locations. In one embodiment of the invention covering the continental United States, there may be 900 such possible field locations, corresponding to the locations on a 30×30 grid which covers the service area, as shown in FIG. 10.

The entries in table 72-1 are preferably maintained by using both an analytic ionospheric prediction model, as well as by using real time inputs which correspond to the observed performance of the system 10.

For example, the table 72-1 may be initially created by using known ionospheric modeling software such as the IONCAP software developed by Link Corporation of Binghampton, N.Y. The IONCAP modeling software, when given a time of day, transmitter and receiver location, estimate of expected solar activity, antenna pattern, and other data, can mathematically predict a probability that given frequency ranges will propagate.

Such analytic propagation model software thus provides a probability, P, of actually receiving a signal at a base station from a particular field location at a given time of day. The information is typically reported for all possible frequencies in the selected band. Thus, there are typically several rows in the table for each location. In addition, since the propagation factors P are time-dependent, an entry is made in the table for each hour of the day.

The propagation model 72-1 may be updated as data is received concerning the actual successes or failures of specific attempts to communicate between field units and particular radio base station locations. The updates may be made, for example, by using a weighted average of the old propagation data value and a new observed propagation data value. The reports of success or failure are received from the MOC controller 32, which reports successful and failed transmissions to the PAP 70 (steps 412 and 415 of FIG. 4).

The propagation model 72-1 may be reset by periodically re-running the ionospheric modeling calculations, such as on a daily basis.

The propagation model 72-1 may also be updated with data concerning known sounding transmitters, sounding transmitter receiver pairs and with other data as reported by the MOC controller 32.

Figure 9:
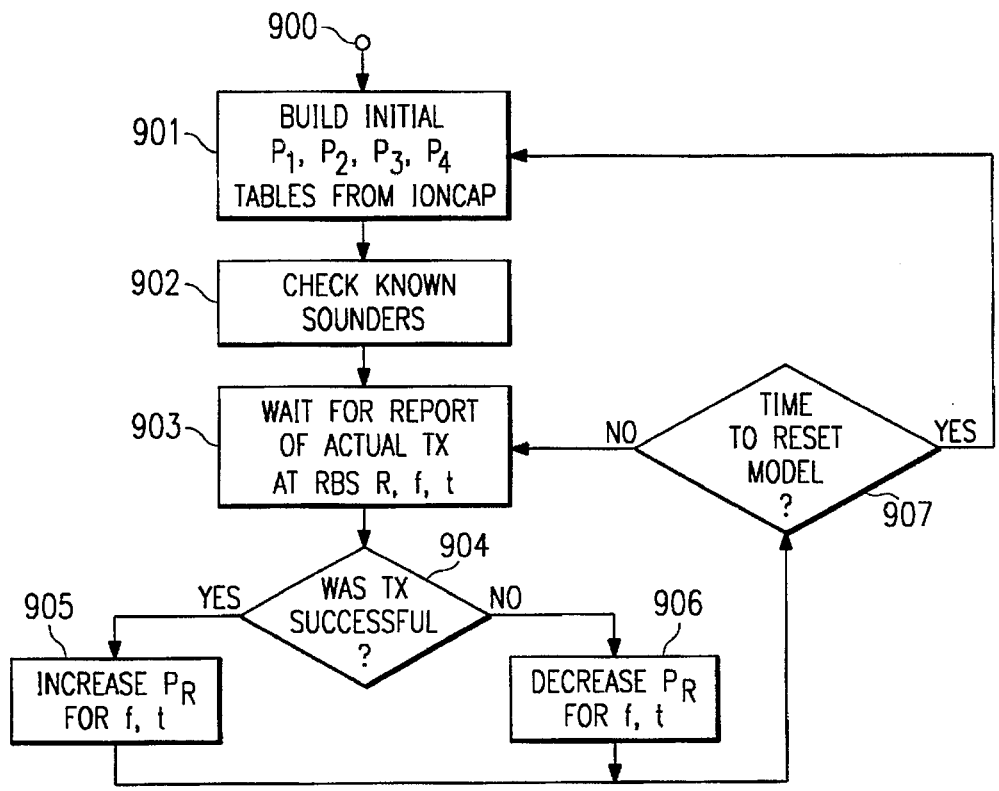
FIG. 9 is a flowchart of the operations performed by the PAP in order to maintain the database of propagation probabilities.

FIG. 9 is a flowchart of the operations performed by the PAP CPU 70-1. From an idle state in step 900, the PAP 70 performs step 901, where the initial propagation model 72-1 is constructed. This is done by iteratively running the propagation prediction software for different times of day and grid locations until the tables are complete for each of the four radio base stations.

Next, in step 902, data concerning known sounders such as broadcast stations and the like in the vicinity of the base stations 60 may be removed from the tables 72.

In step 903, the PAP 70 then waits for reports of actual system transmission activity from the MOC controller 32.

If the MOC controller 32 reports a successful transmission, a decision is made in step 904 to proceed to step 905, where the propagation table 72 for the given basestation is updated. This may be done, for example, by reading the value from the table 72 for the corresponding frequency and time, and increasing the probability value in an appropriate way, such as by a weighted average of the last value and an incremental value.

If however, a failed transmission is reported, step 906 is executed, where the appropriate propagation table entry is reduced in value, again preferably by some weighted average technique.

In either event, control then passes to step 907, where it is determined if it is time to rebuild the propagation model. If it is not, as will usually be the case, the PAP 70 then returns to step 903 to wait for a report of another transmission.

If, however, it is time to rebuild the tables in the model 72, as may be done on a daily basis, control returns to step 901.

What is claimed is:

1. A two-way wireless data communication system comprising:

an outbound messaging sub-system;

an inbound messaging sub-system consisting of at least one radio frequency base station for receiving inbound messages;

a frequency analysis processor (FAP) associated with each of the at least one radio frequency base station, each of the FAPs continuously sampling, at their respective locations, received power levels across a set of frequencies in an inbound radio frequency band, to determine an observed frequency availability level for the set of frequencies for each base station;

a propagation analysis processor (PAP) which determines a probability of propagation for the set of frequencies;

at least one remote field unit having an outbound message receiver and a tunable inbound message transmitter; and a central control unit, wherein the central control unit uses the outbound messaging sub-system to send an outbound message to the remote field unit, and uses the inbound messaging subsystem as an inbound link to receive an inbound message from the field unit, and wherein the outbound message includes data fields indicating an inbound time and an inbound carrier frequency at which the field unit is to send each inbound message, and wherein the central control unit receives reports of the observed frequency availability levels from the FAPs, and the central control unit also receives reports of the probabilities of the frequencies propagating from the PAP, and wherein the central control unit selects the inbound carrier frequency depending upon both the frequency availability levels as reported by the FAPs as well as the probability of the frequency propagating as reported by the PAP, such that the probability that the inbound message will be received by at least one of the base stations without interference from another communication system is maximized.

2. A system as in claim 1 wherein the inbound messaging sub-system uses the high frequency (HF) radio frequency band as the inbound radio frequency band.

3. A system as in claim 2 wherein the outbound messaging sub-system is a paging sub-system.

4. A system as in claim 1 wherein the PAP additionally comprises:

database means, for maintaining a table of propagation probabilities, the propagation table containing an array of entries for each possible frequency and time of day.

5. A system as in claim 2 comprising multiple inbound links implemented by multiple radio base station receivers, and wherein the control unit assigns the carrier frequency depending upon the observed availability of that carrier frequency in each of the multiple radio base station receivers.

6. A system as in claim 4 comprising multiple inbound links implemented by multiple radio base station receivers, and wherein the PAP maintains a propagation table for each of the base station receivers.

7. A system as in claim 4 wherein the propagation table is initially written with propagation probability values determined by an analytic propagation model.

8. A system as in claim 4 wherein the PAP additionally updates the propagation table as successful and failed inbound message transmissions are reported by the MOC.

9. A method of operating a communications system to provide reliable and ubiquitous wireless data communication services between a mission operation center (MOC) an plurality of remote field units, by using a network of widely distributed radio base station (RBS) sites, the method comprising the steps of:

A. at a customer calling station, initiating a request to the MOC to communicate with a particular remote field unit, such as a request for the field unit to determine and report its location;

B. at the MOC site,
  i. receiving reports from a propagation analysis processor (PAP), the PAP reports indicating a probability that a list of radio frequencies will propagate from field unit locations to RBS sites;
  ii. receiving reports from frequency analysis processors (FAPs) located at the RBS sites, the FAP reports indicating a list of radio frequencies which are presently available for the field unit to send an inbound message back to one or more of the RBS sites;
  iii. determining a frequency for the field unit response based upon both the data reported by the PAP as well as the data reported by the FAP;
  iv. determining an available time for the field unit response;
  v. formatting the determined time and frequency for the field unit response into an outbound page message;
  iv. forwarding the page message to at least one of the paging systems;

C. in at least one of the paging system sites, communicating the page message to the field units over the paging system;

D. at the selected field unit,
  i. receiving the page message;
  ii. formulating a response to the page message by reading data available locally to the field unit;
  iii. formulating a response as an inbound message back to the radio base stations;
  iv. encoding the response in the form of a short duration burst message, to minimize the probability of interfering with existing broadcast or other communications at frequencies near the selected frequency;
  v. at the indicated carrier frequency and time, transmitting the inbound message over the air;

E. at the RBS site,
  i. receiving the inbound message from the field unit over the air; and
  ii. forwarding the inbound message back to the MOC;

F. at the MOC site, forwarding the inbound message back to the customer calling station; and G. at the calling station, receiving inbound message.

10. A method as in claim 9 wherein the calling stations are connected to the MOC through the land based public switched telephone network (PSTN).

11. A method as in claim 9 wherein the MOC is connected to the paging systems through the land based public switched telephone network (PSTN).

12. A method as in claim 9 wherein the MOC communicates with the RBSs over a land-based connection such as the public switched telephone network.

13. A method as in claim 9 wherein the MOC communicates with the RBSs over a land-based connection such as a leased private telephone circuits.

14. A method as in claim 9 additionally comprising the step of, at the MOC, alerting one or more of the associated RBSs to expect a response from the indicated field unit at the specified frequency and time.

15. A method as in claim 14 additionally comprising the steps of,

H. at the RBS, if no such inbound message is received as alerted by the MOC, reporting a failed inbound message to the PAP; and I. at the PAP, updating a table of expected probabilities of propagation based upon the failed inbound message report.

16. A method as in claim 14 additionally comprising the steps of,

H. at the RBS, if an inbound message is received as alerted by the MOC, reporting a successful inbound message to the PAP; and I. at the PAP, updating a table of expected probabilities of propagation based upon the successful inbound message report.

17. A method as in claim 9 wherein each FAP additionally performs the step of periodically measuring a receive power level in each possible inbound frequency channel.

18. A method as in claim 9, additionally comprising the step of, at the field unit, collect data to be reported including a latitude and longitude from a geolocation system.

19. A method as in claim 9 wherein the short duration inbound message is encoded using spread spectrum modulation.

20. A method as in claim 9 wherein the MOC communicates with the RBSs over a Very Small Aperture Terminal (VSAT) network.

* * * * *